(12) United States Patent
Sugiyama

(10) Patent No.: US 6,803,556 B2
(45) Date of Patent: Oct. 12, 2004

(54) PHOTOELECTRIC SENSOR AND METHOD OF DETECTING AN OBJECT TO BE DETECTED USING THE SAME

(75) Inventor: Kazutoshi Sugiyama, Osaka (JP)

(73) Assignee: Keyence Corporation, Osaka (JP)

(*) Notice: Subject to any disclaimer, the term of this patent is extended or adjusted under 35 U.S.C. 154(b) by 205 days.

(21) Appl. No.: 10/212,349

(22) Filed: Aug. 5, 2002

(65) Prior Publication Data
US 2003/0071197 A1 Apr. 17, 2003

(30) Foreign Application Priority Data
Oct. 12, 2001 (JP) .................................. P.2001-316108

(51) Int. Cl.⁷ .............................................. H01J 40/14
(52) U.S. Cl. .................................................. 250/214 A
(58) Field of Search ........................ 250/214 A, 214 R, 250/221

(56) References Cited

U.S. PATENT DOCUMENTS 6,211,784 B1 4/2001 Nishide ................... 340/568.1

FOREIGN PATENT DOCUMENTS

JP 05-206821 A * 8/1993

* cited by examiner

Primary Examiner—Thanh X. Luu
(74) Attorney, Agent, or Firm—Kilyk & Bowersox, P.L.L.C.

(57) ABSTRACT

A photoelectric sensor has a light emitting section, a light receiving section, an amplification circuit for amplifying an electric signal from the light receiving section, an A/D converter for converting an output voltage of the amplification circuit into a digital value, and a processing section for controlling the light emitting operation and processing the digital value provided by the A/D converter. In a high-precision mode, the processing section causes the light emitting section to perform the light emitting operation a plurality of times successively, adds a plurality of digital values provided by the A/D converter in response to the light emitting operation performed plurality of times, and processes the digital value of the addition result as a detection value corresponding to the light receiving amount.

12 Claims, 6 Drawing Sheets

(BAR GRAPH DISPLAY) (DECIMAL NUMBER DISPLAY)

FIG. 6

(FIVE-DIGIT DECIMAL NUMBER DISPLAY)

PHOTOELECTRIC SENSOR AND METHOD OF DETECTING AN OBJECT TO BE DETECTED USING THE SAME

BACKGROUND OF THE INVENTION

1. Field of the Invention

The present invention relates to a photoelectric sensor and a method of detecting an object to be detected using the photoelectric sensor. More particularly, the present invention relates to an improvement in signal processing for making it possible to provide high precision while avoiding a saturation phenomenon of a detection value corresponding to the light receiving amount of the photoelectric sensor.

2. Description of the Related Art

A photoelectric sensor, also called a photoelectric switch, has a basic function of sensing whether or not an object to be detected exists in the detection area. The photoelectric sensor comprises a light emitting section, a light receiving section, an amplification circuit, an A/D converter, and a processing section. The light emitting section emits light to the detection area. The light receiving section receives light from the detection area. The amplification circuit amplifies an electric signal corresponding to the light receiving amount output from the light receiving section. The A/D converter converts the output voltage of the amplification circuit into a digital value. The processing section controls the light emitting operation of the light emitting section and processing the digital value provided by the A/D converter.

Light emitted from a light emitting element (LED or laser) of the light emitting section controlled by the processing section is emitted to the detection area. Light passing through the detection area (when the sensor is a transmission photoelectric sensor) or light reflected on the object to be detected (when the sensor is a reflection photoelectric sensor) is received by a light receiving element of the light receiving section and is converted into an electric signal. The electric signal is amplified and shaped in waveform by the amplification circuit and then is converted into a digital value by the A/D converter. The digital value is displayed on a display having a plurality of digit positions using 7-segment LEDs, for example, as a detection value by the processing section. Alternatively, the digital value is compared with a threshold value (setup value), whereby it is output as the detection result of 0 or 1 corresponding to the presence or absence of the object to be detected.

As one of the performance capabilities required for such a photoelectric sensor, a wide dynamic range can be named. That is, it is the performance capability of correctly detecting the light receiving amount from a small light receiving amount to a large light receiving amount. For example, in a reflection photoelectric sensor, if the distance from the photoelectric sensor (light emitting section and light receiving section) to the object to be detected is short under the condition of the same light emitting amount, a large light receiving amount can be provided; if the distance is long, only a small light receiving amount can be provided.

If the light emitting amount is set so that a sufficient light receiving amount can be provided even if the distance is long, it is feared that the light receiving amount may be saturated if the distance is short. If the light amount is set so that a correct detection can be made even if the light receiving amount is small by setting a large amplification ratio of the amplification circuit, it is feared that the amplification circuit or the A/D converter may be saturated if the light receiving amount grows.

On the other hand, if the light emitting amount or the amplification ratio of the amplification circuit is reduced to a low value to avoid saturation of the amplification circuit or the A/D converter, when the distance to the object to be detected is long, a sufficient detection value cannot be provided and it becomes difficult to determine whether or not the object to be detected exists.

To widen the dynamic range while considering such tradeoff relationship between the light receiving sensitivity and saturation, some photoelectric switches in related arts enable the operator to change any of the light emitting amount, the amplification ratio of the amplification circuit, or hysteresis to any one of several steps. For example, the amplification degree is changed to any one of several steps and to display the detection value, a set of the position number of the current amplification degree and the detection value is displayed.

To correctly determine whether or not the object to be detected exists, not only the provided light receiving amount (detection value) needs to be sufficient, but also the change amount of the light receiving amount (detection value) corresponding to the presence or absence of the object to be detected needs to be sufficiently large. If the object to be detected is sufficiently large, it can be expected that the light receiving amount (detection value) when the object to be detected exists will largely change from that when the object to be detected does not exist. However, if the object to be detected is small (or thin), large change cannot be expected. That is, the area of the object to be detected in the emitted light spot diameter, more accurately, the ratio between the light amount contained in the emitted light spot diameter and the light shield amount or the reflected light amount on the object to be detected, which will be hereinafter referred to as light amount ratio, introduces a problem. If the light amount ratio is small, the change amount of the light receiving amount (detection value) corresponding to the presence or absence of the object to be detected reduces and the case where whether or not the object to be detected exists cannot correctly be determined occurs.

To increase the light amount ratio, with the reflection photoelectric sensor, it is effective to shorten the distance from the photoelectric sensor to the object to be detected to the distance at which the emitted light spot diameter does not largely widen. With the transmission photoelectric sensor, likewise, it is effective to shorten the distance between the light emitting section and the light receiving section of the photoelectric sensor so that a large light amount as much as possible arrives at the light receiving section.

However, in either case, the light receiving amount itself grows, causing the problem of saturation of the amplification circuit or the A/D converter as described above to occur. If the light emitting amount or the amplification ratio of the amplification circuit is reduced to a low value to avoid saturation, the change amount of the light receiving amount (detection value) reduces and the detection (determination) capability (namely, resolution) of the presence or absence of a small (or thin) object to be detected is degraded.

To enhance such a resolution, it is possible to increase the number of the bits of the A/D converter (use a high-resolution A/D converter), but the cost of the A/D converter is increased accordingly and it becomes difficult to provide an inexpensive photoelectric sensor.

SUMMARY OF THE INVENTION

It is therefore an object of the invention to provide a photoelectric sensor and a method of detecting an object to be detected using the photoelectric sensor that can detect a small object to be detected with high accuracy by shortening the distance between the photoelectric sensor and the object to be detected as a digital value processing method is devised without using a high-resolution A/D converter leading to an increase in costs.

According to the invention, there is provided a photoelectric sensor comprising a light emitting section for emitting light to a detection area, a light receiving section for receiving light from the detection area, an amplification circuit for amplifying an electric signal corresponding to the light receiving amount output from the light receiving section, an A/D converter for converting an output voltage of the amplification circuit into a digital value, and a processing section for controlling the light emitting operation of the light emitting section and processing the digital value provided by the A/D converter, wherein the photoelectric sensor has a high-precision mode wherein the light emitting amount of the light emitting section or the amplification ratio of the amplification circuit is made lower than that in the normal mode, whereby the amplification circuit or the A/D converter is made hard to be saturated, and wherein in the high-precision mode, the processing section causes the light emitting section to perform the light emitting operation a plurality of times successively, adds a plurality of digital values provided by the A/D converter in response to the light emitting operation performed plurality of times, and processes the digital value of the addition result as a detection value corresponding to the light receiving amount.

According to the configuration, when the object to be detected is small (or narrow), if the high-precision mode is selected and the head section of the photoelectric sensor is brought close to the object to be detected as much as possible, the change amount of the light receiving amount (detection value) corresponding to the presence or absence of the object to be detected can be made large as much as possible while saturation of the light receiving amount (detection value) is avoided. Therefore, the presence or absence of the object to be detected can be detected (determined) with good accuracy. The advantage that the detection accuracy against noise (signal-to-noise (S/N) ratio) is enhanced can also be provided.

In a preferred mode, the photoelectric sensor further comprises a display comprising a first display section and a second display section, each consisting of a plurality of digit places, being placed side by side, wherein the processing section displays the detection value in the first display section and uses the second display section to display any other than the detection value in the normal mode and uses the first and second display sections to display the detection value with an increased number of digit places in the high-precision mode. For example, when the first display section and the second display section have each four display digit places, only the four digit places of the first display section are used to display the detection value in the normal mode and the four digit places of the first display section plus the low-order one digit place of the second display section (a maximum of five digits places) are used to display the detection value in the high-precision mode. Of course, if all of the four digit places of the first display section and the four digit places of the second display section are used, the detection value can be displayed using a maximum of eight digit places.

In doing so, the detection value with an increased number of digits in the high-precision mode can be displaced intact, and the user can recognize that the photoelectric sensor operates in the high-precision mode from the number of digits of the displayed detection value. As for threshold value setting, likewise, the threshold value in the high-precision mode with an increased number of digits may be able to be set using the first and second display sections.

In another preferred mode, in the high-precision mode, the processing section sets a threshold value and a shift amount based on the detection value under a predetermined condition, decrements the shift amount from the threshold value and the detection value (for example, each a five-digit value) to provide a threshold value and a detection value with as many digits as reduced to the maximum number of display digits of the detection value in the normal mode (for example, four digits), and displays the threshold value and the detection value on the display as the threshold value and the detection value for display. In doing so, the detection value in the normal mode and the detection value in the high-precision mode can be displayed only with a display having a limited number of digit places.

In still another preferred mode, the photoelectric sensor further comprises a display comprising a first display section and a second display section, each consisting of a plurality of digit places, being placed side by side, wherein the processing section is responsive to a switch signal input for switching a display mode between a first display mode of using both the first and second display sections to display the detection value with an increased number of digit places and a second display mode of using only either of the first and second display sections to display the detection value for display with a reduced number of digit places. This corresponds to a combination of the two modes described above. In doing so, the user can select either display mode in response to the purpose. For example, to use only the first display section to display the detection value for display with a reduced number of digits in the second display mode, the threshold value for display with a reduced number of digits can be displayed in the second display section.

In another configuration of the photoelectric sensor according to the invention, in the high-precision mode, the processing section causes the light emitting section to perform the light emitting operation a plurality of times successively, averages a plurality of digital values provided by the A/D converter in response to the light emitting operation performed plurality of times, and processes the average digital value as a detection value corresponding to the light receiving amount. That is, in the configuration, a plurality of digital values provided by the A/D converter are added and then the addition result is divided by the number of addition times to find an average and the found average is used as the detection value corresponding to the light receiving amount. In the configuration, apparently the number of digits of the detection value does not increase and the user cannot recognize that the photoelectric sensor operates in the high-precision mode, but the advantage that the detection accuracy against noise (signal-to-noise (S/N) ratio) is enhanced as compared with the case where the detection value provided by only one light emitting operation is used can be provided.

In still another configuration of the photoelectric sensor according to the invention, in the high-precision mode, the processing section adds the digital value provided by the A/D converter a plurality of times or multiplies the digital value by an integer to find a value, and processes the found value as a detection value corresponding to the light receiving amount. In this configuration, the advantage that the detection accuracy against noise (signal-to-noise (S/N) ratio) is enhanced cannot be provided, but the advantage that apparently the number of digits of the detection value

DETAILED DESCRIPTION OF THE INVENTION

Referring now to the accompanying drawings, there is shown a preferred embodiment of the invention.

Figure 1:
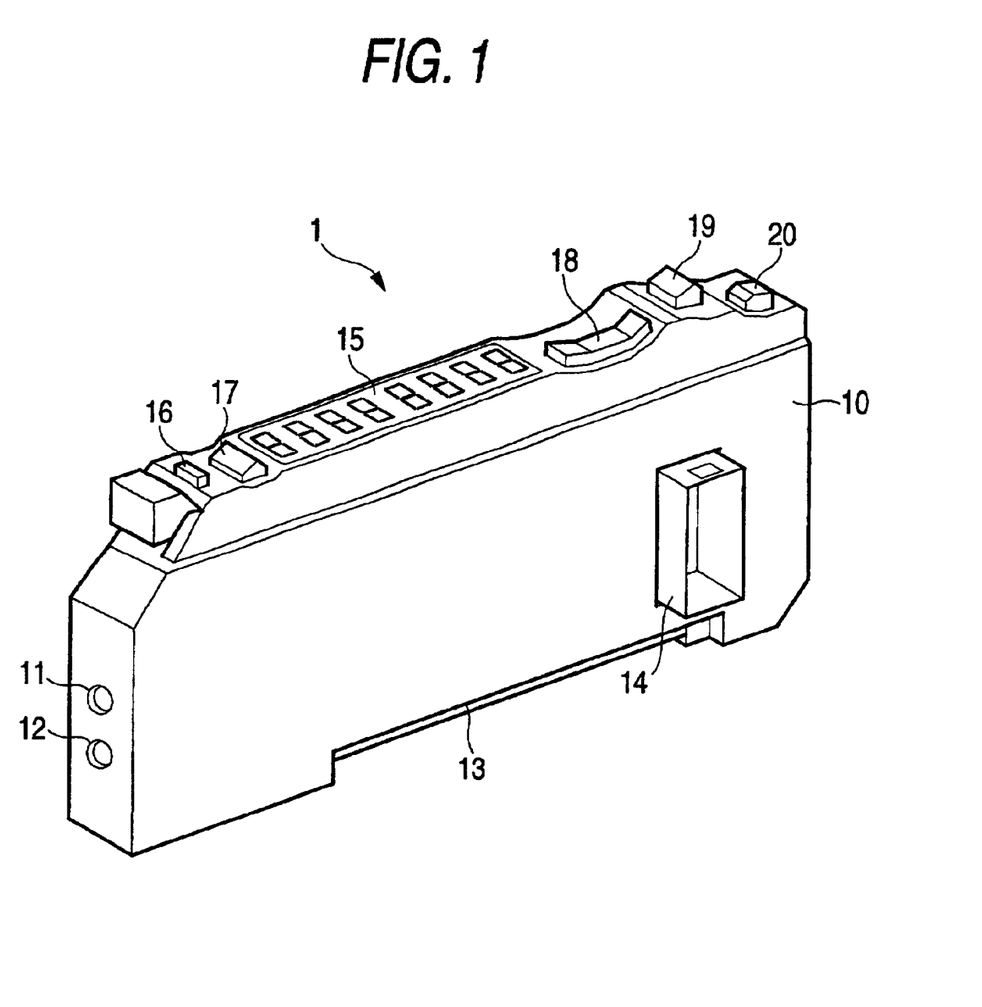
FIG. 1 is a perspective view to show the appearance of a sensor amplifier of a photoelectric sensor according to an embodiment of the invention.

FIG. 1 is a perspective view to show the appearance of an amplification section (sensor amplifier 1) of a photoelectric sensor according to the embodiment of the invention. This sensor amplifier 1 is an example of a photoelectric sensor of optical fiber type and is provided with connection parts (insertion ports) 11 and 12 of a light emitting optical fiber and a light receiving optical fiber on the front of a case 10 shaped like a thin rectangular parallelepiped. It is provided with a cable connection part (not shown) for power supply, detection signal output, etc., on the rear.

A recess well 13 of a lower face is an attachment section for attaching the sensor amplifier 1 to a DIN rail. Normally, a plurality of sensor amplifiers 1 are attached to the DIN rail so that they are arranged side by side. The adjacent sensor amplifiers are joined mechanically and electrically by a male connector 14 provided on one side and a female connector (not shown) provided on an opposite side.

The sensor amplifier 1 is provided on the upper face with a display 15 using eight (four×two) seven-segment LEDs and an indicator 16 which is turned on during emitting light output. It is also provided with pushbutton switches 17 to 20 used to set a threshold value for detection determination, switch the operation mode, the display mode, etc. The pushbutton switch 18 is a swing-type up-down pushbutton switch.

Figure 2:
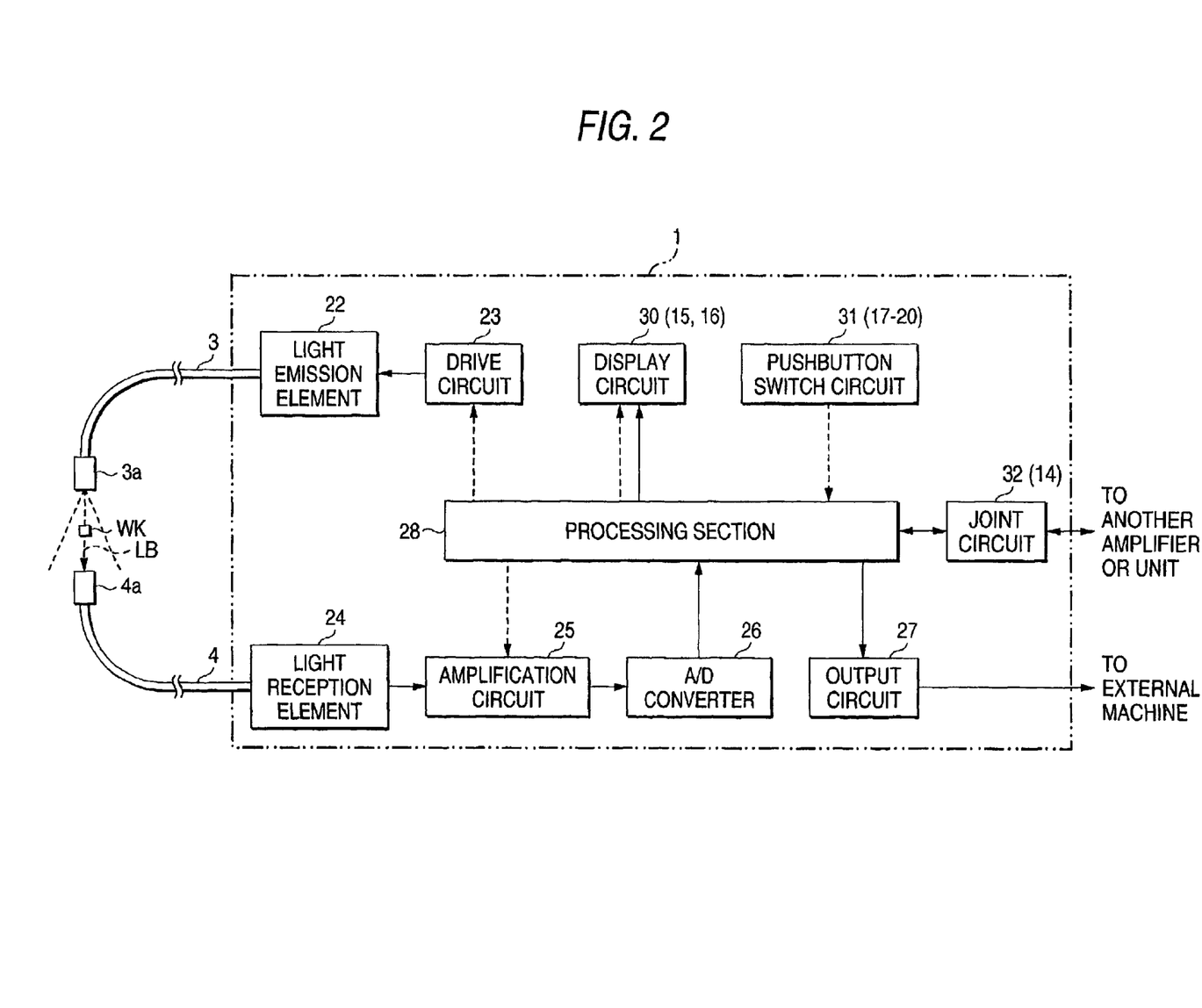
FIG. 2 is a block diagram to show the circuit configuration of the photoelectric sensor according to the embodiment of the invention.

FIG. 2 is a block diagram to show the circuit configuration of the photoelectric sensor according to the embodiment of the invention. In this example, a light emitting optical fiber 3 with a light emitting head 3a attached thereto and a light receiving optical fiber 4 with a light receiving head 4a attached thereto are connected to the sensor amplifier 1 (optical fiber connection parts 11 and 12), forming a transmission photoelectric sensor. The sensor amplifier 1 contains a light emitting element (for example, a light emitting diode) 22 connected to the base end of the light emitting optical fiber 3 and a light receiving element (for example, a photodiode) 24 connected to the base end of the light receiving optical fiber 4. In the example, the light emitting section 22, the light emitting optical fiber 3, and the light emitting head 3a correspond to a light emitting section and the light receiving head 4a, the light receiving optical fiber 4, and the light receiving section 24 correspond to a light receiving section.

Light outgoing from the light emitting section 22 propagates through the light emitting optical fiber 3, is emitted as indicated by the dashed line (as spread at an angle of about 60 degrees) from the tip of the light emitting optical fiber 3 (the light emitting head 3a). The emitted light is incident on the light receiving optical fiber 4 through the light receiving head 4a placed at a position opposed to the light emitting head 3a, and propagates through the light receiving optical fiber 4 to the light receiving section 24. When an object to be detected WK blocks an optical path LB from the light emitting head 3a to the light receiving head 4a, the light receiving amount of the light receiving section 24 reduces and thus the presence or absence of the object to be detected WK can be detected.

To form a reflection photoelectric sensor, the positions and orientations of the light emitting head 3a to the light receiving head 4a are set so that light emitted from the light emitting head 3a is reflected on the object to be detected WK and is incident on the light receiving optical fiber 4 through the light receiving head 4a. Alternatively, a head section comprising the light emitting head 3a and the light receiving head 4a in one piece is used. Various types of photoelectric sensors are available. For example, in a photoelectric sensor called amplifier separation type, a head section contains a light emitting element and a light receiving element, and the head section and a sensor amplifier are connected by an electric cable rather than an optical fiber.

In FIG. 2, the sensor amplifier 1 contains a drive circuit 23 of the light emitting element 22 and a processing section (microprocessor) 28 for controlling the drive circuit 23. It also contains an amplification circuit 25 for amplifying an electric signal corresponding to the light receiving amount output from the light receiving section 24 and an A/D converter 26 for converting an output voltage of the amplification circuit 25 into a digital value. The digital value provided by the A/D converter 26 is input to the processing section 28, which then compares the input digital value with a threshold value described later and outputs the comparison result from an output circuit 27 to an external machine as a binary signal indicating the presence or absence of the object to be detected WK. The photoelectric sensor of the embodiment uses the 12-bit A/D converter 26 and outputs a digital value of 0 to 4095 (decimal number).

The sensor amplifier 1 also contains a display circuit 30 corresponding to the display 15 and the indicator 16, a pushbutton switch circuit 31 corresponding to the pushbutton switches 17 to 20, and a joint circuit 32 corresponding to the joint connectors (male connector 14 and female connector). The processing section 28 also controls the components. In FIG. 2, flows of data related to the light receiving amount and detection value of input/output signals of the processing section 28 are indicated by solid arrows and other control signals are indicated by dashed-line arrows.

Figure 3:
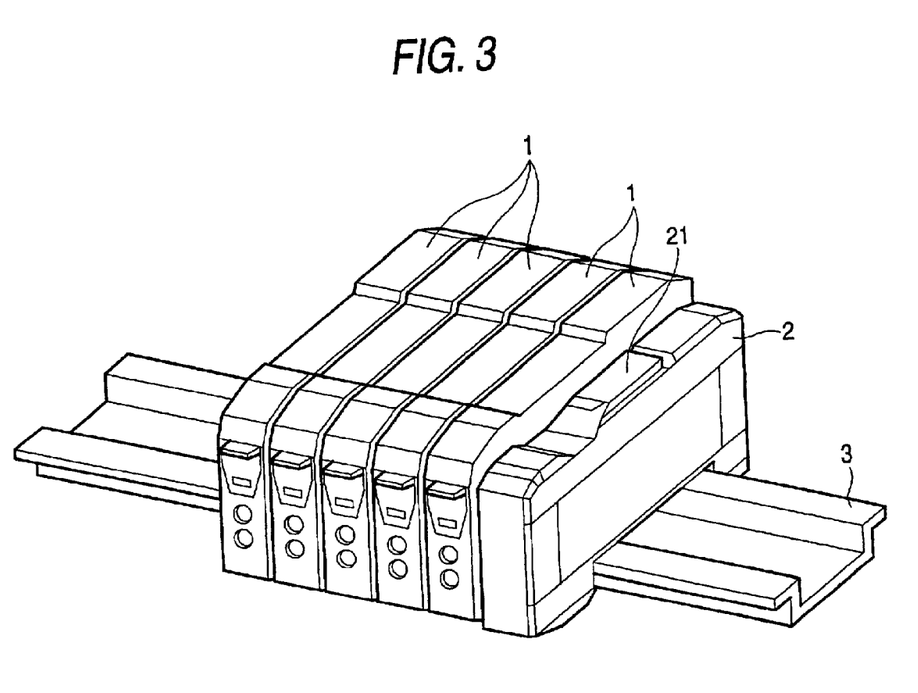
FIG. 3 is a perspective view to show an example of a state in which a plurality of sensor amplifiers and a communication end unit are attached to a DIN rail and are joined side by side.

FIG. 3 shows an example of a state in which a plurality of sensor amplifiers and a communication end unit are attached to a DIN rail and are joined side by side. In this example, five sensor amplifiers 1 and one communication end unit 2 are joined and are fixed to a DIN rail 3. The sensor amplifier 1 shown in FIG. 3 is the sensor amplifier 1 shown in FIG. 1 with a transparent plastic dust cover put on the upper face of the sensor amplifier 1.

The communication end unit 2 has a function of mechanically holding the end parts of the joined sensor amplifiers 1 and a communication function with a management apparatus (for example, personal computer). The communication end unit 2 is formed on a side with a female connector like the sensor amplifier 1 and is joined to the sensor amplifier 1 mechanically and electrically. Four sensor amplifiers 1 other than the sensor amplifier 1 adjacent (directly connected) to the communication end unit 2 are also connected to the communication end unit 2 by a bus via the adjacent sensor amplifiers 1. The five sensor amplifiers 1 can transfer a signal to and from the communication end unit 2 separately.

If a communication connector cover 21 placed on the upper face of the communication end unit 2 is opened, a communication connector connected to the internal circuitry is exposed for enabling a communication cable to be connected. The communication end unit 2 communicates with a personal computer by RS-232C serial communications, for example. That is, the personal computer can online access each of the sensor amplifiers 1 through the communication end unit 2 and can monitor the operation mode and setup value of each sensor amplifier 1 or change the setting.

Figure 4:
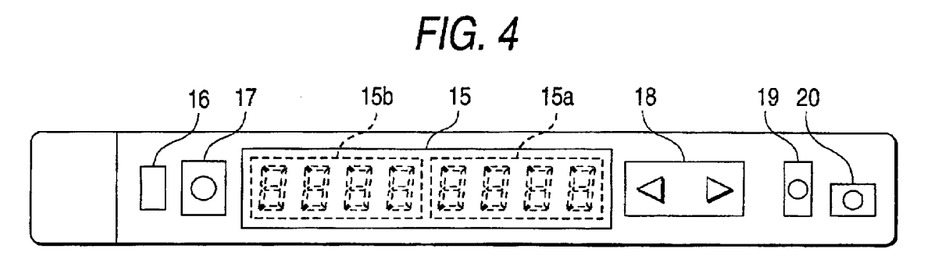
FIG. 4 is a top view of the sensor amplifier shown in FIG. 1.
Figure 5:
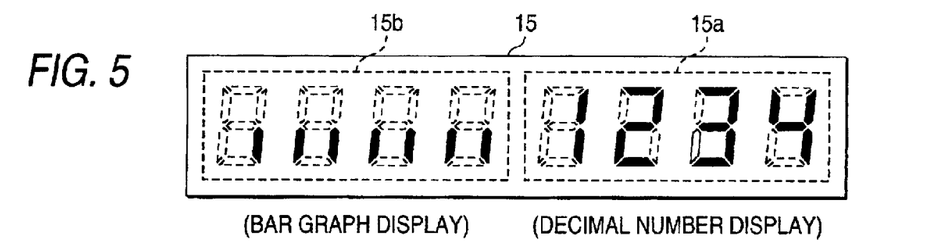
FIG. 5 is a drawing to show a display example using a first display section and a second display section of a display for individual display.

FIG. 4 is a top view of the sensor amplifier 1 shown in FIG. 1. The display 15 placed on the sensor amplifier 1 is a seven-segment eight-digit display and comprises a first display section 15a consisting of four digit places and a second display section 15b consisting of four digit places, the first and second display sections being arranged side by side. For example, the display 15 can be used in such a manner that the first display section 15a (low-order four digits) displays the detection value in decimal notation and the second display section 15b (high-order four digits) displays the threshold value (setup value) in decimal notation during the detection operation. Alternatively, the display 15 can be used in such a manner that the first display section 15a displays the detection value or the threshold value in decimal notation and some segments of each digit place of the second display section 15b are used to display the detection value or the threshold value in a bar graph, as shown in FIG. 5.

Figure 6:
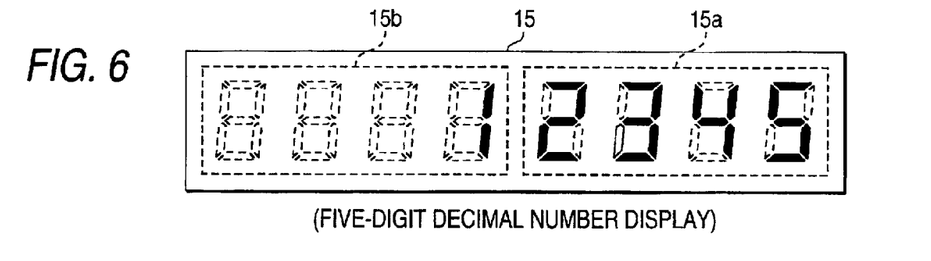
FIG. 6 is a drawing to show an example of a detection value display method in a high-precision mode.

The photoelectric sensor of the embodiment comprises a high-precision mode described later; the maximum number of digits of the detection value or the threshold value (in decimal notation) in the high-precision mode is five although that in the normal mode is four. Then, as one of display methods of the detection value (or the threshold value) in the high-precision mode, both of the first display section 15a and the second display section 15b are used (joined) to display a five-digit decimal number as shown in FIG. 6. Of course, it is made possible to display a decimal number of a maximum of eight digits.

Next, use examples of the pushbutton switches 17 to 20 will be discussed briefly. Each key is shared among a plurality of functions and in the following use examples, the switches are used for some of the functions.

To begin with, to set a threshold value, the pushbutton switch 17 (set SW) and a pushbutton switch 18 (up-down SW) are used. For example, in FIG. 2, the object to be detected WK is placed so as to block the optical path LB from the light emitting head 3a to the light receiving head 4a and the set SW 17 is pressed and then is again pressed with the object to be detected WK removed from the optical path LB. Consequently, the intermediate value of the detection value corresponding to the light receiving amount when the object to be detected WK blocks the optical path LB (for example, 2000) and the detection value corresponding to the light receiving amount when the object to be detected WK does not block the optical path LB (for example, 4000), namely, in this case, 3000 is automatically set as the threshold value.

At this time, the setup threshold value is displayed on the display 15. In the normal mode, the four-digit value is displayed on either of the first display section 15a and the second display section 15b. The up-down SW 18 can be used to increment or decrement the setup threshold value for adjustment.

Figure 7:
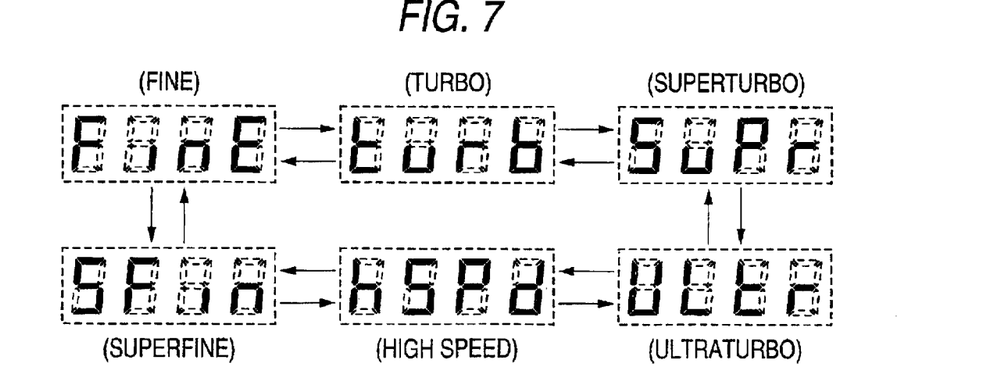
FIG. 7 is a drawing to show a display transition example of operation mode.

Next, to set the operation mode, the pushbutton switch 19 (mode SW) and the up-down SW 18 are used. If the operator continues to press the mode SW 19 for a given time (for example, two seconds) or more, it is made possible to change setting of the operation mode and the operator can use the up-down SW 18 to select the operation mode in order. At this time, the selected operation mode is displayed on the display 15 in abridged alphabetic letters. For example, as shown in FIG. 7, the operation mode makes a transition among the six types of FINE, TURBO, SUPERTURBO, ULTRATURBO, HIGH SPEED, and SUPERFINE in the normal and reverse directions as the operator presses the up-down SW 18.

The six types of operation modes are provided for optimizing the circuit constants of the appropriate light emitting amount (drive pulse width of light emitting element 22), sensitivity (amplification degree of amplification circuit 25), etc., in response to the size of the object to be detected, the distance thereto, etc. For example, the FINE mode corresponds to the normal mode and is optimized to the distance from the light emitting head 3a to the object to be detected WK, about 100 mm. The turbo mode is optimized to 200 mm, the SUPERTURBO mode to 300 mm, and the ULTRATURBO mode to 400 mm. The HIGHSPEED mode is an operation mode with the response speed made high so as to be able to detect the object to be detected WK crossing the optical path LB at comparatively high speed.

The SUPERFINE mode corresponds to the high-precision mode. In the SUPERFINE mode, the light emitting amount or the sensitivity (amplification ratio) is made lower than that in the FINE mode (normal mode), whereby if the distance from the light emitting head 3a to the object to be detected WK is made shorter than that in the FINE mode, the amplification circuit 25 or the A/D converter 26 is made hard to be saturated. In doing so, the spread of the emitted light spot diameter is reduced and if the object to be detected WK is small (or thin), it can be detected precisely. However, as the light receiving amount decreases, the processing section 28 executes processing of compensating for decrease in the light receiving amount as described later.

In addition to the described operation modes, the photoelectric sensor comprises various modes such as a differentiation mode of performing differentiation operation on detection value change and outputting a rising or falling edge detection signal and a timer mode of outputting a detection signal in a delay time (that can be set) after the rising or falling edge. A plurality of display modes of the display 15 are also provided. Each of the modes can be switched by combining the pressing order of the pushbutton switches 17 to 20 and the pressing way (for example, press for two seconds or more, twice press, etc.,).

Figure 8:
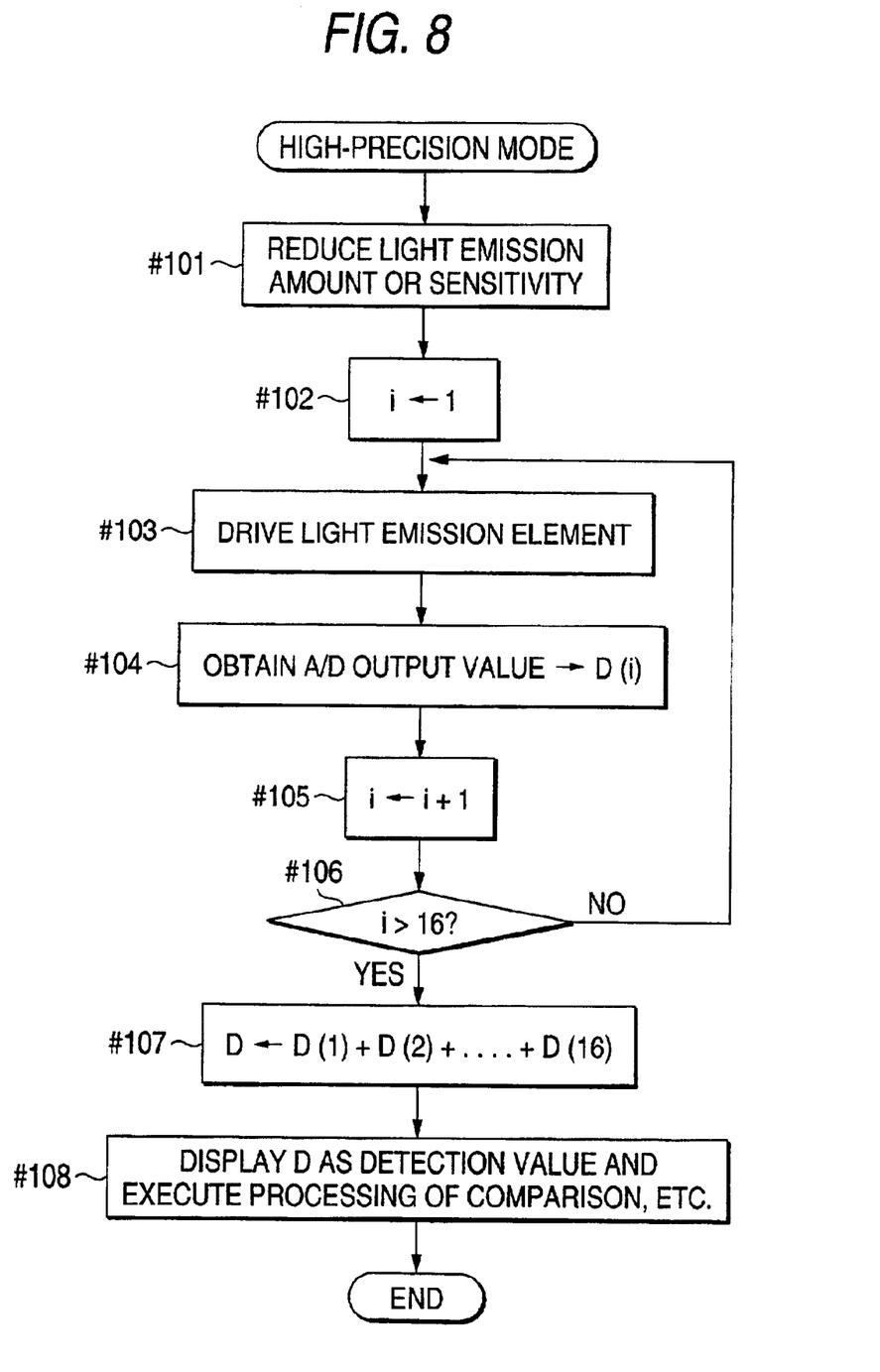
FIG. 8 is a flowchart of processing concerning a detection value, executed by a processing section in the high-precision mode.

FIG. 8 is a flowchart of processing concerning the detection value, executed by the processing section 28 in the high-precision mode (SUPERFINE mode). At step #101, the processing section 28 makes the light emitting amount (drive pulse width of light emitting element 22) or the sensitivity (amplification ratio of amplification circuit 25) lower than that in the normal mode (FINE mode). Accordingly, as described above, if the distance from the light emitting head 3a to the object to be detected WK is shortened to suppress the spread of the emitted light spot diameter, the amplification circuit 25 or the A/D converter 26 becomes hard to be saturated. Consequently, if the object to be detected WK is small (or thin), it can be detected precisely.

At steps #102 to #107, the processing section 28 causes the light emitting operation (driving the light emitting element at step #103) to be executed 16 times successively, and adds 16 digital values (output values D(1) to D(16)) provided by the A/D converter 26 in response to the respective light emitting operations.

The digital value D of the addition result is displayed as the detection value corresponding to the light receiving amount and is compared with the threshold value and detection output of a binary signal is generated. The addition result of the 16 digital values is used as the detection value, whereby the maximum level of the detection value becomes 16 ($2^4$) times. For example, a 16-bit detection value can be provided using the 12-bit A/D converter 26, and the resolution is enhanced as much as four bits. The advantage that the detection accuracy against noise (signal-to-noise (S/N) ratio) is enhanced can be provided.

The 16-bit detection value corresponds to a decimal number in the range of 0 to 65535 and becomes a detection value of a maximum of five digits. The detection value is displayed using a maximum of five digit places (four digit places of the first display section 15a plus low-order one digit place of the second display section 15b) as described above. A value of a maximum of five digits is also set by automatic setting and manual adjustment as described above for the threshold value in response to the detection value.

The number of light emitting times (the number of times an A/D converter output value is added) is not limited to 16, of course; it may be reduced or increased. If the number of light emitting times is increased and the maximum number of digits of the detection value becomes six or more, no problem arises. The first display section 15a and the second display section 15b can be used (joined) to display a maximum of eight digits, as described above.

Figure 9:
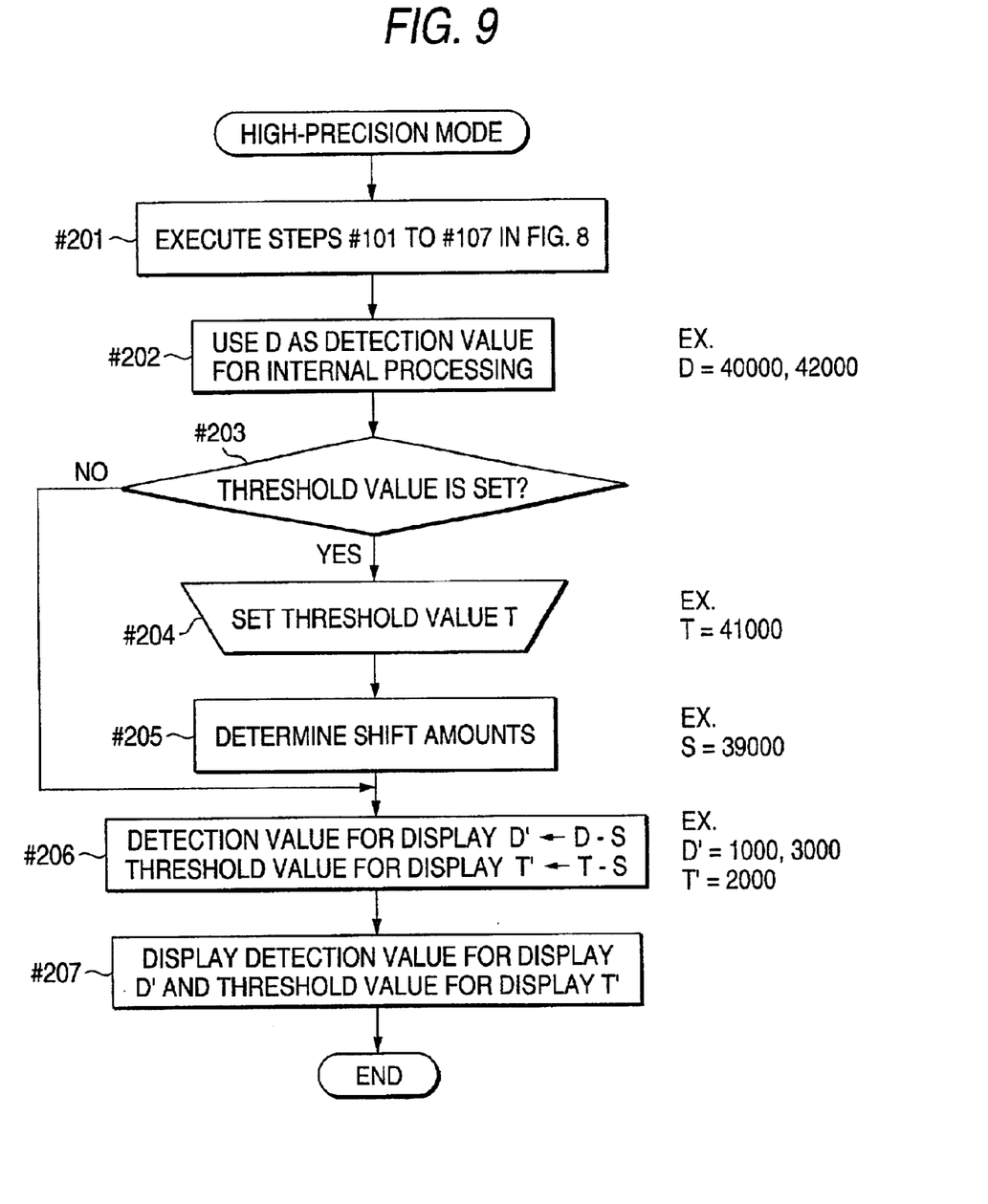
FIG. 9 is a flowchart to show a modification of the flowchart of FIG. 8.

FIG. 9 shows a modification of the flowchart of FIG. 8. In the modification, after steps #101 to #107 in FIG. 8 are performed (step #201), D is used as a detection value for internal processing rather than used as a display value intact (step #202). For example, assume that the detection value D when the object to be detected WK is at a position blocking the optical path LB is 40000 and that the detection value D when the object to be detected WK is at a position not blocking the optical path LB is 42000.

To set the threshold value (YES at step #203), as the set SW 17 is operated as described above, threshold value T (for example, 41000, intermediate value of 40000 and 42000) is automatically set at step #204. At step #205 following step #204, the processing section 28 also automatically sets a shift amount S (for example S=39000).

At step #206, the shift amount S is subtracted from the detection value D for internal processing to find a detection value D' for internal processing and the shift amount S is subtracted from the threshold value T (for internal processing) to find a threshold value T' for display. In the example, D' (in light shield mode) 40000−39000=1000, D' (in light non-shield mode)=42000−39000=3000, and T'=41000−39000=2000. According to the operations, five-digit decimal numbers of the detection value and the threshold value for internal processing become four-digit decimal numbers of the detection value and the threshold value for display. In other words, the shift amount S is automatically set at step #205 so that the five-digit detection value and the five-digit threshold value for internal processing become the four-digit detection value and the four-digit threshold value for display.

At step #207, the four-digit detection value and the four-digit threshold value for display are displayed on the display 15. For example, the detection value for display can be displayed on the first display section 15a and the threshold value for display can be displayed on the second display section 15b as with the normal mode described above.

Either the display mode of switching between the five-digit detection value and threshold value for internal processing and displaying the five-digit detection value or threshold value using both the first display section 15a and the second display section 15b or the display mode of simultaneously displaying the four-digit detection value and threshold value for display on the first display section 15a and the second display section 15b may be made selectable as the mode SW 19 is operated. The shift amount S automatically set at step #205 may be made manually adjustable with the up-down SW 18 as with automatic setting of the threshold value.

As another modification of the flowchart of FIG. 8, the average value provided by dividing the addition result D by the number of addition times (16) may be used as the detection value D' for processing of display, comparison, etc., instead of using the addition result D intact as the detection value corresponding to the light receiving amount at step #108. Also in this case, the five-digit detection value is reduced to a four-digit detection value, so that it is made possible to display the detection value only using the first display section 15a as with the normal mode. The advantage that the detection accuracy against noise (signal-to-noise (S/N) ratio) is enhanced can also be provided as with the case described above.

As still another modification of the flowchart of FIG. 8, the processing section 28 may drive the light emitting element 22 (for performing light emitting operation) only once and use the value provided by adding the digital value provided by the A/D converter 26 more than once (for example, 16 times) or multiplying the digital value by an integer (for example, 16) as the detection value corresponding to the light receiving amount for processing of display, comparison, etc. In this case, the advantage that the detection accuracy against noise (signal-to-noise (S/N) ratio) is enhanced cannot be provided, but the advantage that apparently the number of digits of the detection value increases and the user can be made to recognize the high-precision mode can be provided.

Although the embodiment of the invention has been described containing several modifications as required, it is to be understood that the invention can be embodied in various forms in addition to the embodiment and modifications described above. For example, in the embodiment, the first display section 15a and the second display section 15b make up one display 15, but may be provided by two separate displays.

The number of digit places contained in the first display section 15a or the second display section 15b is not limited to four in the embodiment and is arbitrary. The first display section 15a and the second display section 15b need not always have the same number of digit places.

In the embodiment, the four digit places of the first display section 15a and one digit place of the second display section 15b are used to display a five-digit detection value in the high-precision mode, but two or three digit places of the second display section 15b may be used or all the four digit places of the first display section 15a and all the four digit places of the second display section 15b (eight digit places in total) may be used as the maximum number of display digit places in the high-precision mode. To combine some digit places of the second display section 15b with the first display section 15a to display a detection value in the high-precision mode, other digit places may be used for any other display purpose. For example, any desired segments of any other digit place may be used to display the operation mode.

The invention can be applied not only to transmission photoelectric sensors for sensing whether or not the object to be detected blocks the optical path from the light emitting section to the light receiving section, but also to reflection photoelectric sensors for sensing whether or not light from the light emitting section is reflected on the object to be detected and is received at the light receiving section. The invention can be applied to various photoelectric sensors (or photoelectric switches) of not only the optical fiber type wherein the light emitting element and the light receiving element are contained in the sensor amplifier, but also the amplifier separation type wherein the head section containing the light emitting element and the light receiving element is connected to the sensor amplifier by an electric cable and the type wherein a laser is used.

As described above, according to the photoelectric sensor of the invention, when the object to be detected is small (or narrow), if the high-precision mode is selected and the head section of the photoelectric sensor is brought close to the object to be detected as much as possible, the change amount of the light receiving amount (detection value) corresponding to the presence or absence of the object to be detected can be made large as much as possible while saturation of the light receiving amount (detection value) is avoided. Therefore, the presence or absence of the object to be detected can be detected (determined) with good accuracy. The advantage that the detection accuracy against noise (signal-to-noise (S/N) ratio) is enhanced can also be provided.

What is claimed is:

1. A photoelectric sensor comprising:
    a light emitting section for emitting light to a detection area;
    a light receiving section for receiving light from the detection area;
    an amplification circuit for amplifying an electric signal corresponding to a light receiving amount output from said light receiving section;
    an A/D converter for converting an output voltage of said amplification circuit into a digital value; and
    a processing section for controlling light emitting operation of said light emitting section and processing the digital value provided by said A/D converter,
    wherein said photoelectric sensor has a high-precision mode wherein a light emitting amount of said light emitting section or an amplification ratio of said amplification circuit is made lower than that in a normal mode, whereby said amplification circuit or said A/D converter is made hard to be saturated, and wherein the processing section, in the high-precision mode, causes said light emitting section to perform the light emitting operation a plurality of times successively, adds a plurality of digital values provided by said A/D converter in response to the light emitting operation performed plurality of times, and processes the digital value of the addition result as a detection value corresponding to the light receiving amount.

2. The photoelectric sensor as claimed in claim 1, further comprising:
    a display comprising a first display section and a second display section, each consisting of a plurality of digit places, being placed side by side,
    wherein said processing section displays the detection value in the first display section and uses the second display section to display any other than the detection value in the normal mode and uses the first and second display sections to display the detection value with an increased number of digit places in the high-precision mode.

3. The photoelectric sensor as claimed in claim 1, wherein in the high-precision mode, said processing section sets a threshold value and a shift amount based on the detection value under a predetermined condition, decrements the shift amount from the threshold value and the detection value to provide a threshold value and a detection value with as many digits as reduced to the maximum number of display digits of the detection value in the normal mode, and displays the threshold value and the detection value from each which the shift amount is decremented on a display as a threshold value and a detection value for display.

4. The photoelectric sensor as claimed in claim 3, further comprising:
    a display comprising a first display section and a second display section, each consisting of a plurality of digit places, being placed side by side,
    wherein said processing section is responsive to a switch signal input for switching a display mode between a first display mode of using both the first and second display sections to display the detection value with an increased number of digit places and a second display mode of using only either of the first and second display sections to display the detection value for display with a reduced number of digit places.

5. A photoelectric sensor comprising:
    a light emitting section for emitting light to a detection area;
    a light receiving section for receiving light from the detection area;
    an amplification circuit for amplifying an electric signal corresponding to a light receiving amount output from said light receiving section;
    an A/D converter for converting an output voltage of said amplification circuit into a digital value; and
    a processing section for controlling light emitting operation of said light emitting section and processing the digital value provided by said A/D converter,
    wherein said photoelectric sensor has a high-precision mode wherein a light emitting amount of said light emitting section or an amplification ratio of said amplification circuit is made lower than that in a normal mode, so that said amplification circuit or said A/D converter is not saturated, and wherein the processing section, in the high-precision mode, causes said light emitting section to perform the light emitting operation a plurality of times successively, averages a plurality of digital values provided by said A/D converter in response to the light emitting operation performed plurality of times, and processes the average digital value as a detection value corresponding to the light receiving amount.

6. A photoelectric sensor comprising:

a light emitting section for emitting light to a detection area;

a light receiving section for receiving light from the detection area;

an amplification circuit for amplifying an electric signal corresponding to a light receiving amount output from said light receiving section;

an A/D converter for converting an output voltage of said amplification circuit into a digital value; and a processing section for controlling light emitting operation of said light emitting section and processing the digital value provided by said A/D converter, wherein said photoelectric sensor has a high-precision mode wherein a light emitting amount of said light emitting section or an amplification ratio of said amplification circuit is made lower than that in a normal mode, so that said amplification circuit or said A/D converter is not saturated, and wherein the processing section, in the high-precision mode, adds the digital value provided by said A/D converter a plurality of times or multiplies the digital value by an integer to find a value, and processes the found value as a detection value corresponding to the light receiving amount.

7. A method of detecting an object to be detected using a photoelectric sensor, in a high-precision mode wherein a light emitting amount or an amplification ratio of an electric signal corresponding to a light receiving amount is made lower than that in a normal mode, the method comprising:

performing, a plurality of times successively, a light emitting operation of emitting light to a detection area with the light emitting amount;

performing, in response to the light emitting operation performed plurality of times, a light receiving operation of receiving light from the detection area, a amplification operation of amplifying the electric signal corresponding to the light receiving amount of the received light with the amplification ratio, and a converting operation of converting an output voltage of the amplified electric signal into a digital value, so as to provide a plurality of digital values in response to the light emitting operation performed plurality of times; and adding the plurality of digital values provided in response to the light emitting operation performed plurality of times; and processing the digital value of the addition result as a detection value corresponding to the light receiving amount.

8. The method of detecting an object to be detected using a photoelectric sensor as claimed in claim 7, further comprising:

setting a threshold value and a shift amount based on the detection value;

decrementing the shift amount from the threshold value and the detection value to provide a threshold value and a detection value with as many digits as reduced to the maximum number of display digits of the detection value in the normal mode; and displaying the threshold value and the detection value from each which the shift amount is decremented on the display as a threshold value and a detection value for display.

9. A photoelectric sensor having a light emitting section for emitting light to a detection area, a light receiving section for receiving light from the detection area, an amplification circuit for amplifying an electric signal corresponding to a light receiving amount output from said light receiving section, an A/D converter for converting an output voltage of said amplification circuit into a digital value and a processing section for controlling light emitting operation of said light emitting section and processing the digital value provided by said A/D converter, said photoelectric sensor comprising:

a normal mode having either a predetermined light emitting amount emitted by said light emitting section or a predetermined amplification ratio of said amplification circuit;

a high-precision mode having either lower light emitting amount emitted by said light emitting section than said predetermined light emitting amount in said normal mode or lower amplification ratio of said amplification circuit than said predetermined amplification ratio of said amplification circuit in said normal mode to be made harder saturation condition of said light receiving amount of said light receiving section;

a switching means for switching between said normal and high-precision modes;

a display section for displaying a numeral with a first predetermined digit number based on said processed digital value of said processing section in said normal mode and a numeral with a second predetermined digit number which is larger than said first predetermined digit number in said normal mode, based on said processed digital value of said processing section in said high-precision mode, wherein when said high precision mode is selected by said switching means, said processing section causes said light emitting section to perform the light emitting operation a plurality of times successively, adds a plurality of digital values provided by said A/D converter in response to the light emitting operation performed plurality of times, processes the digital value corresponding to the added plurality of digital values as a detection value corresponding to the light receiving amount and causes said display section to display a numeral corresponding to the processed digital number in said high-precision mode.

10. The photoelectric sensor as claimed in claim 9, wherein said display section comprises a first display section and a second display section, each consisting of a plurality of digit places, being placed side by side, and wherein said processing section displays the detection value in the first display section and uses the second display section to display any other than the detection value in the normal mode, and uses the first and second display sections to display the detection value with an increased number of digit places in the high-precision mode.

11. The photoelectric sensor as claimed in claim 9, wherein in the high-precision mode, said processing section sets a threshold value and a shift amount based on the detection value under a predetermined condition, decrements the shift amount from the threshold value and the detection value to provide a threshold value and a detection value with as many digits as reduced to the maximum number of display digits of the detection value in the normal mode, and displays the threshold value and the detection value from each which the shift amount is decremented on the display section as a threshold value and a detection value for display.

12. The photoelectric sensor as claimed in claim 11, wherein said display section comprises a first display section and a second display section, each consisting of a plurality of digit places, being placed side by side, and wherein said processing section is responsive to a switch signal input for switching a display mode between a first display mode of using both the first and second display sections to display the detection value with an increased number of digit places and a second display mode of using only either of the first and second display sections to display the detection value for display with a reduced number of digit places.

* * * * *